United States Patent
Choi et al.

(10) Patent No.: US 12,229,394 B2
(45) Date of Patent: Feb. 18, 2025

(54) ELECTRONIC DEVICE FOR SETTING BACKGROUND SCREEN AND OPERATING METHOD THEREFOR

(71) Applicant: SAMSUNG ELECTRONICS CO., LTD., Suwon-si (KR)

(72) Inventors: Myungkyu Choi, Suwon-si (KR); Gounyoung Kim, Suwon-si (KR); Jiwoon Kim, Suwon-si (KR); Kyoungsoo Son, Suwon-si (KR); Chansoon Heo, Suwon-si (KR); Donghyun Yeom, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/202,251

(22) Filed: May 25, 2023

(65) Prior Publication Data

US 2023/0297221 A1 Sep. 21, 2023

Related U.S. Application Data

(63) Continuation of application No. PCT/KR2021/016799, filed on Nov. 16, 2021.

(30) Foreign Application Priority Data

Nov. 26, 2020 (KR) .................. 10-2020-0160930

(51) Int. Cl.
 *G06F 3/04845* (2022.01)
(52) U.S. Cl.
 CPC .......... *G06F 3/04845* (2013.01); *G06F 2203/04803* (2013.01)
(58) Field of Classification Search
 CPC ........... G06F 3/04845; G06F 3/0482; G06F 3/04817; G06F 2203/04803
 See application file for complete search history.

(56) References Cited

U.S. PATENT DOCUMENTS

| | | |
|---|---|---|
| 6,593,942 B1 | 7/2003 | Bushmitch et al. |
| 8,359,541 B1 | 1/2013 | Landry |
| 8,943,426 B2 | 1/2015 | Lu et al. |
| 9,594,354 B1 | 3/2017 | Kahn et al. |
| 10,181,210 B2 | 1/2019 | Lee et al. |
| 10,304,347 B2 | 5/2019 | Wilson et al. |

(Continued)

FOREIGN PATENT DOCUMENTS

| | | |
|---|---|---|
| JP | 10200873 A | 7/1998 |
| JP | 2005159850 A | 6/2005 |

(Continued)

OTHER PUBLICATIONS

Yan Xu et al., Adjustable semi-automatic wallpaper sticking machine, Dec. 1, 2020, International Conference on Mechanical—Control and Computer Engineering, pp. 921-924 (Year: 2020).*

(Continued)

*Primary Examiner* — Tam T Tran
(74) *Attorney, Agent, or Firm* — CANTOR COLBURN LLP

(57) ABSTRACT

Various embodiments relate to a device and a method for setting a background screen in an electronic device. The electronic device comprises a display, and at least one processor, wherein the processor may: identify a plurality of content to be displayed on the display; identify screen complexity value of each content based on features included in screens of the plurality of content; obtain display information of an object to be displayed above the plurality of content in the display; set an output order of the plurality of content based on the screen complexity value of the plurality of content and the display information of the object; display the object through the display based on the display information of the object; and display the plurality of content under the object based on the output order.

18 Claims, 18 Drawing Sheets

(56) References Cited

U.S. PATENT DOCUMENTS

| | | | |
|---|---|---|---|
| 10,572,571 B2 | 2/2020 | Block et al. | |
| 10,692,263 B2 | 6/2020 | Heo et al. | |
| 2012/0050316 A1* | 3/2012 | Rainisto | G06T 11/60 345/619 |
| 2013/0117697 A1* | 5/2013 | Lu | G06F 3/04817 715/765 |
| 2016/0062568 A1* | 3/2016 | Takiguchi | A63F 13/792 345/676 |
| 2018/0181078 A1* | 6/2018 | Imamura | G04G 9/0064 |
| 2020/0264567 A1 | 8/2020 | Ok et al. | |
| 2020/0310631 A1 | 10/2020 | Jiang et al. | |

FOREIGN PATENT DOCUMENTS

| | | | |
|---|---|---|---|
| JP | 2008269095 | A | 11/2008 |
| JP | 2009296397 | A | 12/2009 |
| JP | 5616003 | B2 | 10/2014 |
| KR | 20060000551 | A | 1/2006 |
| KR | 101485497 | B1 | 1/2015 |
| KR | 20160021607 | A | 2/2016 |
| KR | 20180097921 | A | 9/2018 |
| KR | 20200101209 | A | 8/2020 |

OTHER PUBLICATIONS

Xiaohan Feng et al., Prediting and Generating Wallpaper Texture with Semantic Properties, Jul. 1, 2018, 11th International Conference on Human System Interaction, pp. 63-69 (Year: 2018).*

International Search Report and Written Opinion for International Application No. PCT/KR2021/016799; International Filing Date Nov. 16, 2021; Date of Mailing Feb. 18, 2022; 53 Pages.

* cited by examiner

ELECTRONIC DEVICE FOR SETTING BACKGROUND SCREEN AND OPERATING METHOD THEREFOR

CROSS-REFERENCE TO RELATED APPLICATION(S)

This application is a continuation application, claiming priority under § 365(c), of International Application No. PCT/KR2021/016799 filed on Nov. 16, 2021, which is based on and claims the benefit of Korean patent application number 10-2020-0160930, filed on Nov. 26, 2020, in the Korean Intellectual Property Office, the disclosures of which are incorporated by reference herein in their entireties.

TECHNICAL FIELD

Various embodiments of the disclosure relate to a device and a method for configuring a background screen in an electronic device.

BACKGROUND ART

An electronic device may configure a user-preferred image as a background image of the electronic device. For example, the background screen may include an image selected based on a user input among an image captured by a camera of the electronic device or images stored in the electronic device.

The electronic device may display an object, such as an icon and/or a widget, on the background screen. For example, the electronic device may display at least one object selected based on a user input to overlap with at least part of the background screen.

DISCLOSURE OF INVENTION

Technical Problem

When at least one object is displayed on a background screen of an electronic device, visibility of the at least one object and/or the background screen may be reduced. For example, at least part of the background screen may be obscured by the at least one object displayed to overlap the background screen. In another example, when the color of the at least one object is similar to the color of a region of the background screen in which the at least one object is displayed, visibility of the at least one object may be reduced due to the color of the background screen.

The electronic device may be configured in a form worn on a wrist of the user (e.g., a watch form), such as a watch or a bracelet. The electronic device may include a display device having a relatively small size to be worn on a body part of the user. The electronic device may display a background screen (e.g., a watch face) and at least one object through the display device having the relatively small size, thus reducing visibility of the at least one object and/or the background screen.

Solution to Problem

Various embodiments of the disclosure disclose a device and a method for configuring at least one object and/or a background screen in consideration of visibility in an electronic device. According to various embodiments, an electronic device may include a display module and at least one processor operatively connected to the display module, wherein the processor may identify a plurality of pieces of content to be displayed on the display module, may identify screen complexity of each piece of content, based on a feature included in a screen of the plurality of pieces of content, may obtain display information about an object to be displayed above the plurality of pieces of content on the display module, may configure an output order of the plurality of pieces of content, based on the screen complexity of the plurality of pieces of content and the display information about the object, and may display the object, based on the display information about the object, and the plurality of pieces of content under the object, based on the output order, via the display module.

According to various embodiments, an operating method of an electronic device may include identifying a plurality of pieces of content to be displayed on a display module operatively connected to the electronic device, identifying screen complexity of each piece of content, based on a feature included in a screen of the plurality of pieces of content, obtaining display information about an object to be displayed above the plurality of pieces of content on the display module, configuring an output order of the plurality of pieces of content, based on the screen complexity of the plurality of pieces of content and the display information about the object, and displaying the object, based on the display information about the object, and the plurality of pieces of content under the object, based on the output order, via the display module.

According to various embodiments, an electronic device may include a display module and at least one processor operatively connected to the display module, wherein the processor may identify content to be displayed on the display module, may identify at least one of screen complexity or a region of interest of the content, based on a feature included in a screen of the content, may obtain display information about an object to be displayed above the content on the display module, may configure at least one of a position or size of the content to be displayed in a display area of the display module, based on at least one of the screen complexity or the region of interest of the content and the display information about the object, and may display the object, based on the display information about the object, and at least part of the content under the object, based on the at least one of the position or size of the content to be displayed.

Advantageous Effects of Invention

According to various embodiments of the disclosure, an electronic device may configure an output order of a plurality of pieces of content to be configured as a background, based on analysis information (e.g., a region of interest and/or screen complexity of the content) about the content and information (e.g., a position, a shape, a size, or a type) related to display of an object displayed in an upper area of a background screen, thereby securing visibility of (e.g., displaying) at least one object and/or the background screen.

According to various embodiments, an electronic device may configure information related to display of content to be configured as a background screen, based on analysis information (e.g., a region of interest and/or screen complexity of the content) about the content and information related to display of an object displayed in an upper area of the background screen, thereby securing visibility of (e.g., displaying) at least one object and/or the background screen.

According to various embodiments, an electronic device may configure information related to display of an object displayed in an upper area of a background screen, based on analysis information (e.g., a region of interest and/or screen complexity of content) about content to be configured as a background screen, thereby securing visibility of (e.g., displaying) at least one object and/or the background screen.

MODE FOR THE INVENTION

Hereinafter, various embodiments are described in detail with reference to the attached drawings.

Figure 1:
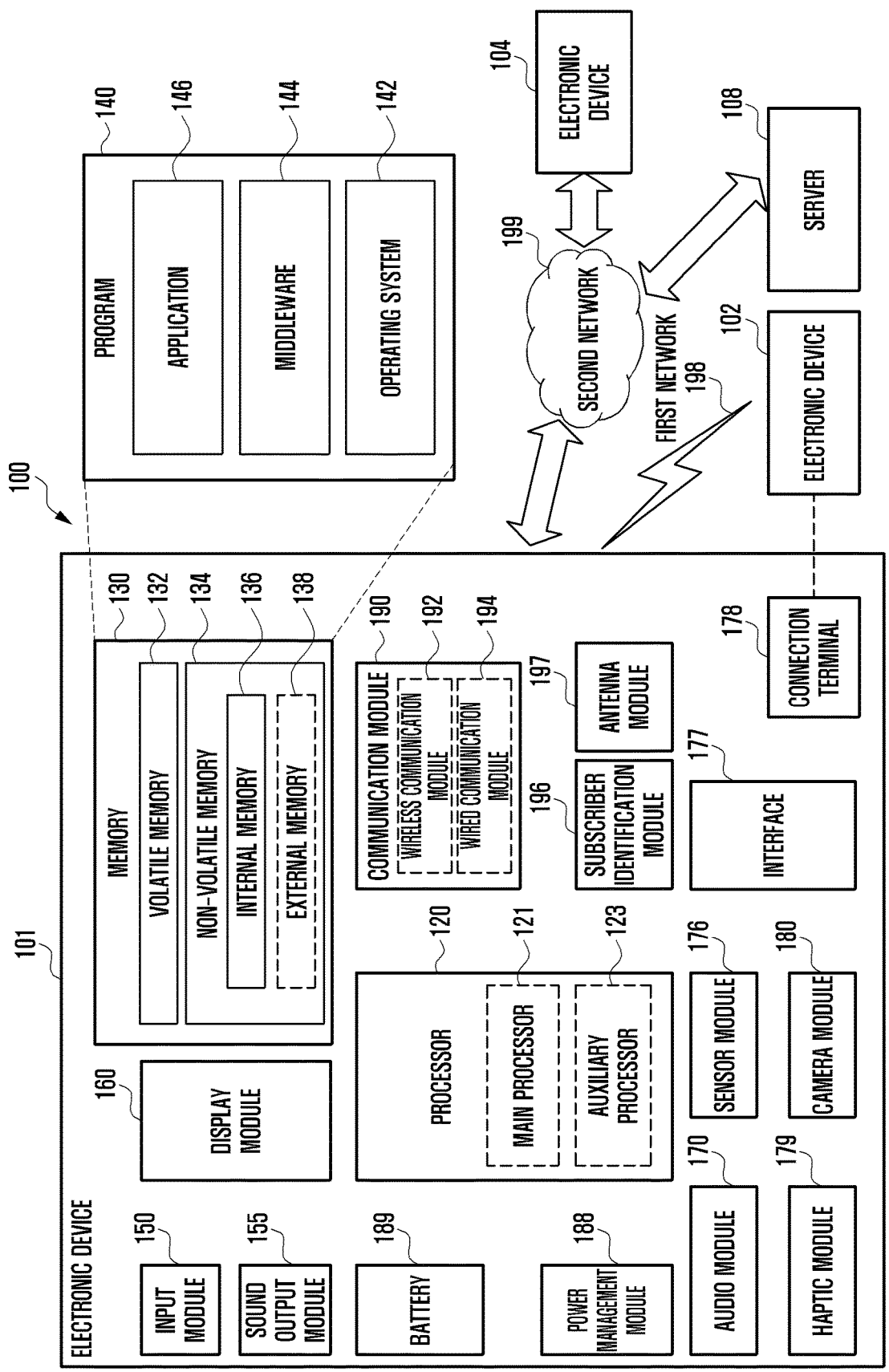
FIG. 1 is a block diagram of an electronic device in a network environment according to various embodiments.

FIG. 1 is a block diagram illustrating an electronic device in a network environment according to an embodiment of the disclosure. Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an high frequency band (e.g., mmWave) antenna module. According to an embodiment, the high frequency band (e.g., mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, an electronic device may refer to a main device including authority to control wireless communication (e.g., Bluetooth or Bluetooth Low Energy (BLE)) among a plurality of electronic devices connected via the communication. An external electronic device may refer to a secondary device which transmits and/or receives data to and/or from the electronic device (e.g., the main device), based on control of the electronic device (e.g., the main device). For example, the electronic device (e.g., the main device) may include a portable electronic device (e.g., a smartphone) or a wearable device (e.g., a wireless earphone) having authority to control communication. For example, the external electronic device (e.g., the secondary device) may include a wearable device (e.g., a wireless earphone) or a portable electronic device (e.g., a smartphone) to perform communication based on control of the electronic device (e.g., the main device).

Figure 2:
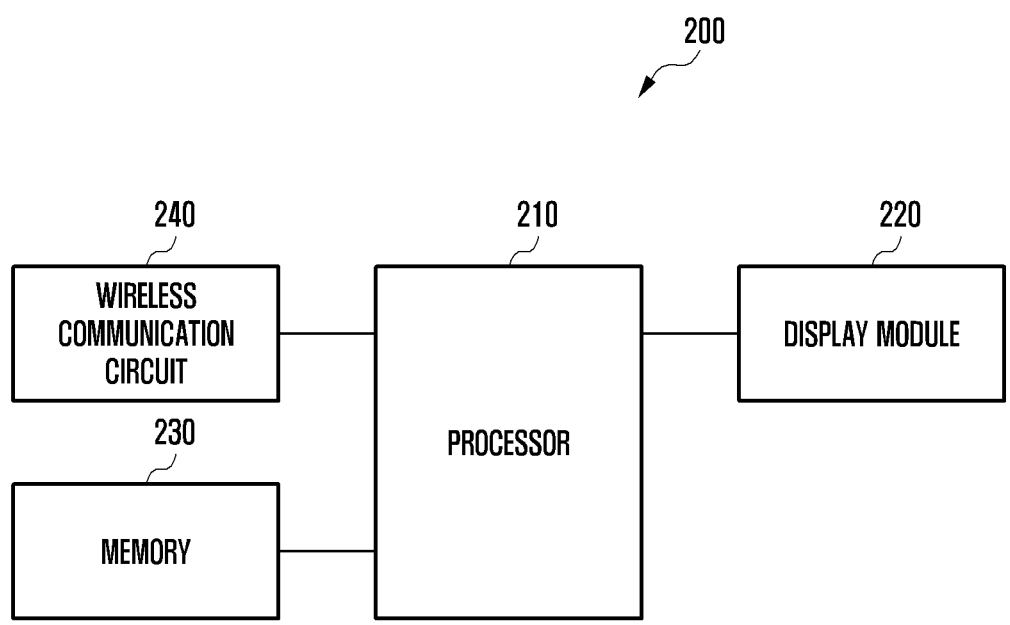
FIG. 2 is a block diagram of an electronic device for configuring a background screen according to various embodiments of the disclosure.

FIG. 2 is a block diagram of an electronic device for configuring a background screen according to various embodiments of the disclosure. According to an embodiment, the electronic device 200 of FIG. 2 may be at least partially similar to the electronic device 101 of FIG. 1, or may further include other embodiments of the electronic device.

Referring to FIG. 2, according to various embodiments, the electronic device 200 may include a processor 210 (e.g., including processing circuitry), a display module 220 (e.g., display or display device), a memory 230, and/or a wireless communication circuit 240. According to an embodiment, the processor 210 may be substantially the same as the processor 120 of FIG. 1, or may include the processor 120. The display module 220 may be substantially the same as the display module 160 of FIG. 1, or may include the display module 160. The memory 230 may be substantially the same as the memory 130 of FIG. 1, or may include the memory 130. The wireless communication circuit 240 may be substantially the same as the wireless communication module 192 of FIG. 1, or may include the wireless communication module 192.

According to various embodiments, the processor 210 may control the display module 220, the memory 230, and/or the wireless communication circuit 240 which are operatively connected thereto.

According to various embodiments, the processor 210 may identify at least one piece of content to be configured as a background screen. According to an embodiment, the processor 210 may identify at least one piece of content selected by a user input from among a plurality of pieces of content stored in the memory 230. For example, the at least one piece of content may include at least one piece of image (or still image) content and/or at least one piece of video content. For example, the processor 210 may select at least one piece of content related to a theme selected by a user input from among the plurality of pieces of content stored in the memory 230. According to an embodiment, the processor 210 may identify at least one piece of content selected by an application program being executed in the electronic device 200 from among the plurality of pieces of content stored in the memory 230. According to an embodiment, the processor 210 may identify at least one piece of content selected based on a user input among a plurality of pieces of content stored in an external electronic device (e.g., the electronic device 102 or 104 or the server 108 of FIG. 1) which is connected for communication through the wireless communication circuit 240. For example, the processor 210 may receive a content list stored in the external electronic device through the wireless communication circuit 240. The processor 210 may recognize at least one piece of content selected by a user input from the content list stored in the external electronic device as content for configuring a background screen. According to an embodiment, the processor 210 may receive information related to at least one piece of content to be configured as a background screen from the external electronic device through the wireless communication circuit 240.

According to various embodiments, the processor 210 may identify analysis information about at least one piece of content to be configured as a background screen. According to an embodiment, the analysis information about the content may include a region of interest (ROI) of the content and/or screen complexity (or screen complexity value) of the content. For example, the screen complexity (or screen complexity value) of the content is detected based on a feature included in a screen related to the content to be displayed on the display module 220, and the screen complexity (or screen complexity value) of the content may indicate at least one of uniformity of the screen, a change in color, and/or a movement of an object included in the screen. For example, when determining, based on the feature included in the screen, that the screen is relatively nonuniform, a change in color is relatively significant, or there are a relatively large number of movements of the object included in the screen, the processor 210 may determine the content as having a relatively high screen complexity. In another example, when determining, based on the feature included in the screen, that the screen is relatively uniform, a change in color is relatively insignificant, or there are a relatively small number of movements of the object included in the screen, the processor 210 may determine the content as having a relatively low screen complexity.

According to an embodiment, the processor 210 may divide a screen of content to be displayed on the display module 200 into a plurality of regions, and may estimate screen complexity in each region, based on a feature included in each region. For example, when content to be configured as a background screen is video content, the processor 210 may divide each frame included in the video content into a plurality of regions, and may estimate screen complexity in each region. For example, screen complexity of the video content may include the average of screen complexities of frames in each region. For example, the feature included in the screen of the content may include features extracted based on a statistical value of intensity of the screen of the content, color distribution, a gradient histogram, gradient statistics, a transform coefficient of a frequency domain, and/or parameters for distributions. However, the feature included in the screen of the content is not limited to the above examples, and may include various types of information extractable from the screen of the content. For example, the number of regions divided to estimate screen complexity may be fixed or variable. For example, the number of regions divided to estimate screen complexity may vary based on a user input, the size and/or position of content to be configured as a background screen, or the position and/or size of an object displayed in an upper area of a background screen.

According to an embodiment, the processor 210 may detect a region of interest and/or screen complexity of content via image analysis of each of at least one piece of content.

According to an embodiment, the processor 210 may receive analysis information (e.g., a region of interest and/or screen complexity of content) related to at least one piece of content to be configured as a background screen from the external electronic device through the wireless communication circuit 240.

According to various embodiments, the processor 210 may configure an output order of a plurality of pieces of content (e.g., still image content and/or video content) to be configured as a background screen, based on regions of interest and/or screen complexities of the plurality of pieces of content. According to an embodiment, the processor 210 may configure an object display area for each piece of content, based on a region of interest and/or screen complexity of each of the plurality of pieces of content. For example, the object display area may include at least one region which is determined as being capable of displaying at least one object because screen complexity is less than a reference complexity within a screen of the content divided into a plurality of regions. According to an embodiment, when configuring the plurality of pieces of content (e.g., still image content and/or video content) as the background screen, the processor 210 may identify information related to display of at least one object displayed in an upper area of the background screen. For example, the information related to the display of the object may include at least one of the shape of the object, the size of the object, the position of the object, and/or the type of the object. For example, the information related to the display of the object may include information related to the shape and/or position of the object that changes over time. According to an embodiment, the processor 210 may configure the output order of the plurality of pieces of content, based on the object display area of the plurality of pieces of content and the shape and/or position of an object according to time. For example, the processor 210 may configure, based on the shape and/or position of the object changing over time, the output order of the pieces of content such that at least one object displayed on the display module 220 at a specific time is displayed in the object display area of the content. According to an embodiment, the processor 210 may configure the output order of the plurality of pieces of content, based on the object display area of the plurality of pieces of content, a playback time of the content, and the shape and/or position of the object according to time. For example, the output order of content indicates an order in which the content is configured as the background screen, and the plurality of pieces of content may be sequentially configured as the background screen of the electronic device 200, based on the output order.

According to various embodiments, when configuring at least one piece of video content as a background screen, the processor 210 may configure a playback order of the video content, based on a region of interest and/or screen complexity of the video content to be configured as the background screen. According to an embodiment, the processor 210 may divide the video content into a plurality of playback sections, based on a region of interest and/or screen complexity of each of a plurality of frames included in the video content. For example, a playback section may include at least two consecutive frames determined to have a relative similarity in the position of a region of interest and/or screen complexity. For example, the at least two consecutive frames determined to have the relative similarity in the position of the region of interest and/or the screen complexity may include frames which are consecutive in the playback order and have a difference in a region of interest therebetween within a reference distance or frames which are consecutive in the playback order and have a difference in screen complexity therebetween within a reference value. According to an embodiment, the processor 210 may configure an object display area for each playback section of the video content. For example, the object display area may include at least one region having a relatively low screen complexity within frames included in the playback section. According to an embodiment, the processor 210 may configure a playback order of the plurality of playback sections, based on an object display area of the plurality of playback sections and the shape and/or position of an object according to time. For example, the processor 210 may configure, based on the shape and/or position of the object changing over time, the playback order of the video content such that at least one object displayed on the display module 220 at a specific time is displayed in the object display area of the video content. According to an embodiment, the processor 210 may configure the playback order of the video content, based on the object display area of each playback section included in the video content, a playback time of the playback section, and the shape and/or position of the object according to time. For example, the playback order of the video content indicates output times of the plurality of playback sections included in the video content configured as the background screen, and the plurality of playback sections included in a video may be output as the background screen of the electronic device 200, based on the playback order.

According to various embodiments, the processor 210 may configure at least one piece of content (e.g., still image content and/or video content) to be configured as a background screen, based on information related to display of at least one object displayed in an upper area of the background screen. According to an embodiment, the processor 210 may configure an object display area for each piece of candidate content, based on analysis information of a plurality of pieces of candidate content configurable as a background screen. For example, the analysis information about the content may include a region of interest and/or screen complexity of the content. According to an embodiment, the processor 210 may configure at least one piece of content having an object display area corresponding to the shape and/or position of the at least one object among the plurality of pieces of candidate contents as content to be configured as the background screen.

According to various embodiments, the processor 210 may configure information related to display of content (e.g., still image content and/or video content) as a background screen, based on information related to display of at least one object displayed in an upper area of the background screen. According to an embodiment, the processor 210 may identify analysis information (e.g., a region of interest and/or screen complexity) about the content to be displayed as the background screen and the information related to the display of the at least one object displayed in the upper area of the background screen. For example, the processor 210 may adjust at least one of the position and/or size of at least one piece of content to be displayed as a background screen so that a region of interest of the at least one piece of content does not overlap a position where the at least one object is displayed. In another example, the processor 210 may configure an object display area, based on screen complexity of content to be displayed as a background screen. The processor 210 may adjust at least one of the position and/or size of video content so that at least one object is displayed in the object display area of the content. For example, the processor 210 may extract (e.g., crop) at least a portion of the entire area of the content to output as a background screen, based on the position and/or size of the content to be displayed as a background screen. In another example, the processor 210 may control the display module 220 to move the display position of the entire area of the content to be displayed as the background screen, based on the position of the content. For example, the information related to the display of the content may include at least one of the size of a region of interest of the content and/or the position of the region of interest.

According to various embodiments, the processor 210 may configure information related to display of at least one object displayed in an upper area of a background screen, based on analysis information about content (e.g., still image content and/or video content) to be configured as the background screen. According to an embodiment, the processor 210 may adjust at least one of the position and/or size of at least one object so that a region of interest of content to be displayed as a background screen does not overlap a position where the at least one object is displayed. According to an embodiment, the processor 210 may configure an object display area, based on screen complexity of content to be displayed as a background screen. The processor 210 may adjust at least one of the position and/or size of at least one object so that the at least one object is displayed in the object display area of the content.

According to various embodiments, the display module 220 may display information processed in the electronic device 200. According to an embodiment, the display module 220 may display information related to content (e.g., still image content and/or video content) configured as a background screen on a first display layer. For example, when a plurality of pieces of content is configured as a background screen, the display module 220 may sequentially display the pieces of content, based on an output order configured by the processor 210. In another example, when content configured as a background screen is video content, the display module 220 may display a playback screen of each playback section included in the video content, based on a playback order configured by the processor 210. According to an embodiment, the display module 220 may display at least one object in a second display layer which at least partially overlaps the first display layer in an upper area of the first display layer. For example, the at least one object may include at least one of an icon or a widget.

According to various embodiments, the memory 230 may store various pieces of data used by at least one component (e.g., the processor 210, the display module 220, and/or the wireless communication circuit 240) of the electronic device 200. For example, the data may include at least one of analysis information about content to be configured as a background screen, information related to display of content, and/or information related to display of an object.

According to various embodiments, the wireless communication circuit 240 may support wireless communication with the external electronic device. According to an embodiment, the wireless communication circuit 240 may transmit and/or receive data to and/or from the external electronic device through an established communication link. For example, wireless communication may include cellular communication (e.g., long-term evolution (LTE) or new radio (NR)) and/or short-range communication (e.g., wireless LAN, Bluetooth, and Bluetooth Low Energy (BLE)).

According to various embodiments, an electronic device (e.g., the electronic device 101 of FIG. 1 or the electronic device 200 of FIG. 2) may include a display module (e.g., the display module 160 of FIG. 1 or the display module 220 of FIG. 2) and at least one processor (e.g., the processor 120 of FIG. 1 or the processor 210 of FIG. 2) operatively connected to the display module, wherein the processor may identify a plurality of pieces of content to be displayed on the display module, may identify screen complexity (or screen complexity value) of each piece of content, based on a feature included in a screen of the plurality of pieces of content, may obtain display information about an object to be displayed above the plurality of pieces of content on the display module, may configure an output order of the plurality of pieces of content, based on the screen complexity of the plurality of pieces of content and the display information about the object, and may display the object, based on the display information about the object, and the plurality of pieces of content under the object, based on the output order, via the display module.

According to various embodiments, the processor may divide the screen of the content into a plurality of regions, and may identify the screen complexity of the content by region, based on a feature included in each region.

According to various embodiments, the processor may configure at least one region of each piece of content as an object display area, based on the screen complexity of the content by region, and may configure the output order of the plurality of pieces of content so that the object is displayed in the object display area of the content, based on the display information about the object.

According to various embodiments, the object display area may include at least one region having screen complexity less than or equal to a reference complexity among the plurality of regions included in the content.

According to various embodiments, the display information about the object may include at least one piece of information among a display position, a size, a color, a shape, and/or a brightness of the object changing over time.

According to various embodiments, the display information about the object may include position information about a clock hand changing clockwise over time when the object is related to an analog clock.

According to various embodiments, the electronic device may further include a memory (e.g., the memory 130 of FIG. 1 or the memory 230 of FIG. 2) configured to store the screen complexity of the plurality of pieces of content, and the processor may identify the screen complexity of each piece of content stored in the memory.

According to various embodiments, the electronic device may further include a wireless communication circuit (e.g., the wireless communication module 192 of FIG. 1 or the wireless communication circuit 240 of FIG. 2), and the memory may store the screen complexity (or screen complexity value) of the plurality of pieces of content received from an external electronic device through the wireless communication circuit.

According to various embodiments, an electronic device (e.g., the electronic device 101 of FIG. 1 or the electronic device 200 of FIG. 2) may include a display module (e.g., the display module 160 of FIG. 1 or the display module 220 of FIG. 2) and at least one processor (e.g., the processor 120 of FIG. 1 or the processor 210 of FIG. 2) operatively connected to the display module, wherein the processor may identify content to be displayed on the display module, may identify at least one of screen complexity (or screen complexity value) or a region of interest of the content, based on a feature included in a screen of the content, may obtain display information about an object to be displayed above the content on the display module, may configure at least one of a position or size of the content to be displayed in a display area of the display module, based on at least one of the screen complexity or the region of interest of the content and the display information about the object, and may display the object, based on the display information about the object, and at least part of the content under the object, based on the at least one of the position or size of the content to be displayed, via the display module.

According to various embodiments, the processor may divide the screen of the content into a plurality of regions, and may identify the screen complexity of the content by region, based on a feature included in each region.

According to various embodiments, the processor may configure at least one region of the content as an object display area, based on the screen complexity of the content by region, and may configure at least one of the position or size of the content to be displayed so that the object is displayed in the object display area of the content, based on the display information about the object.

According to various embodiments, the display information about the object may include at least one piece of information among a display position, a size, a color, a shape, and/or a brightness of the object.

According to various embodiments, the processor may configure at least one of the position and/or size of the content to be displayed so that the object does not overlap the region of interest of the content, based on the display information about the object.

Figure 3:
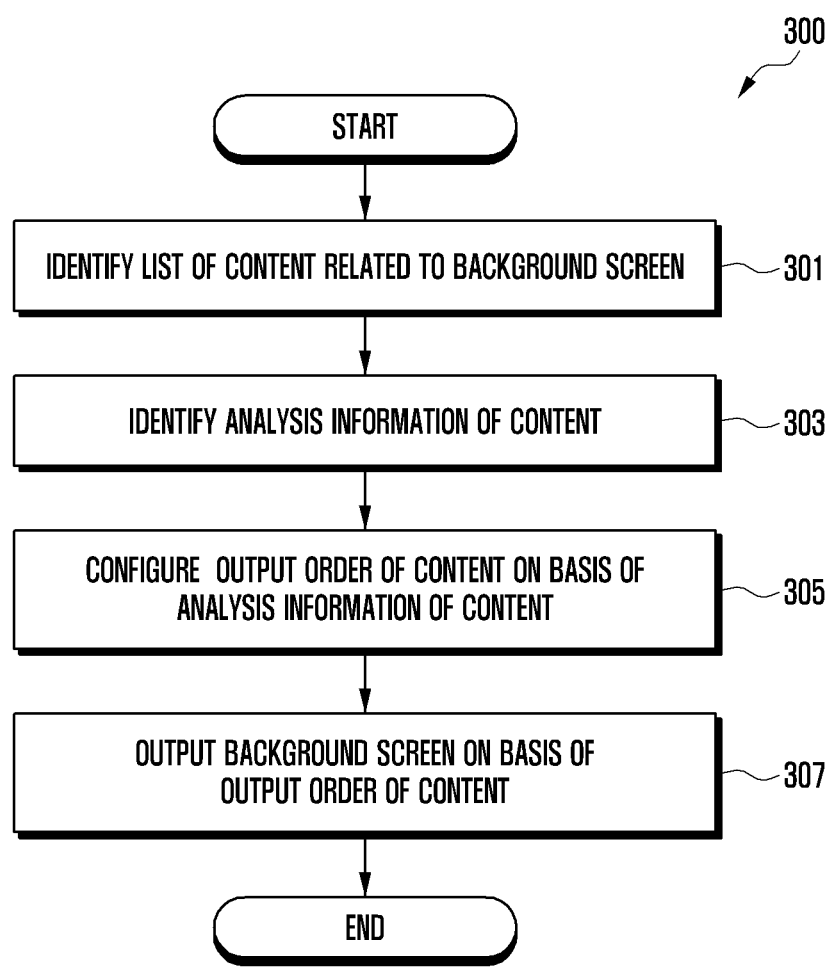
FIG. 3 is a flowchart for configuring an output order of pieces of content in an electronic device according to various embodiments of the disclosure.
Figure 4A:
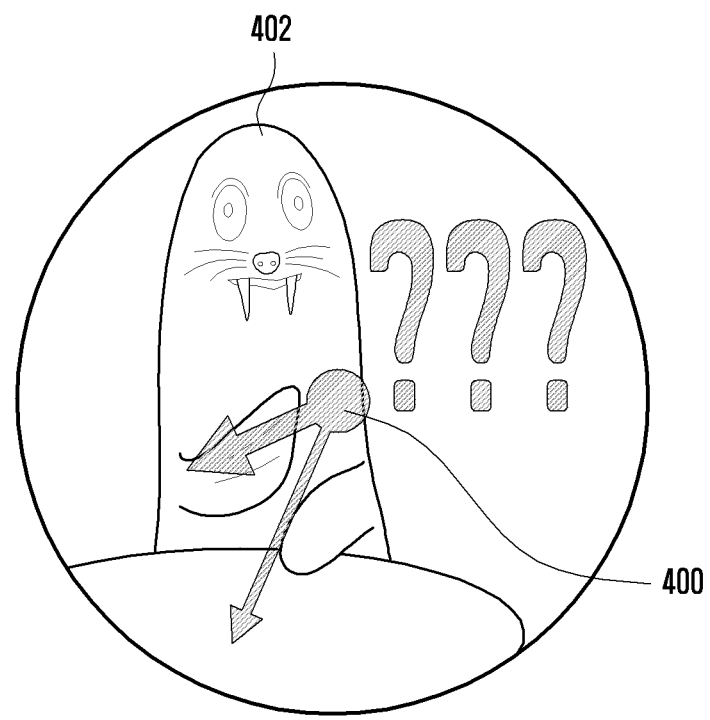
FIG. 4A illustrates an example of a background screen of an electronic device according to various embodiments of the disclosure.
Figure 4B:
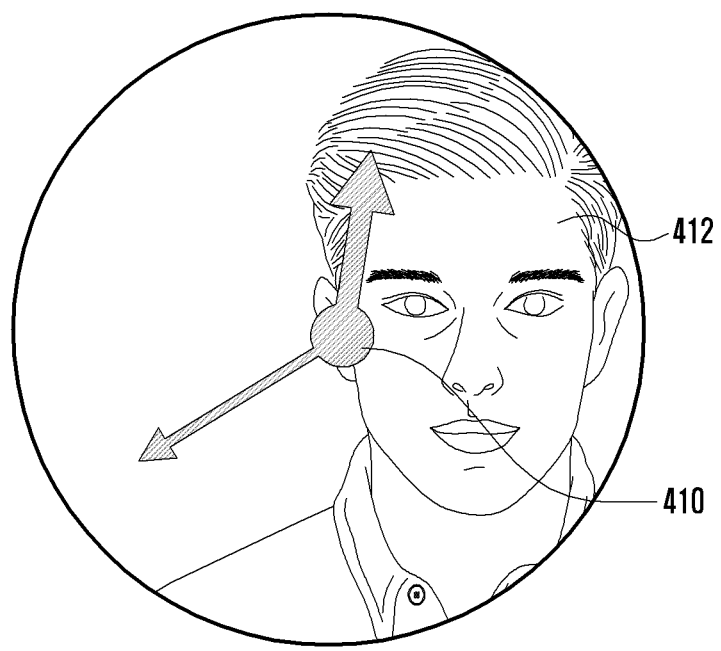
FIG. 4B illustrates an example of a background screen of an electronic device according to various embodiments of the disclosure.
Figure 4C:
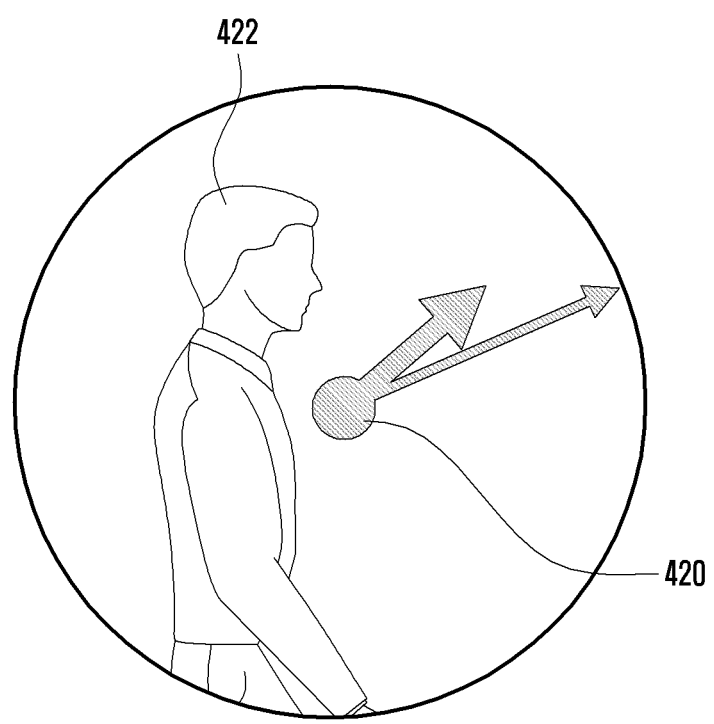
FIG. 4C illustrates an example of a background screen of an electronic device according to various embodiments of the disclosure.

FIG. 3 is a flowchart 300 for configuring an output order of pieces of content in an electronic device according to various embodiments of the disclosure. In the following embodiments, operations may be sequentially performed, but are not necessarily performed sequentially. For example, the operations may be performed in a different order, or at least two operations may be performed in parallel. For example, the electronic device of FIG. 3 may be the electronic device 101 of FIG. 1 or the electronic device 200 of FIG. 2. For example, at least some components of FIG. 3 will be described with reference to FIG. 4A, FIG. 4B, and FIG. 4C. FIG. 4A, FIG. 4B, and FIG. 4C illustrate examples of a background screen of an electronic device according to various embodiments of the disclosure.

Referring to FIG. 3, according to various embodiments, in operation 301, the electronic device (e.g., the processor 120 of FIG. 1 or the processor 210 of FIG. 2) may identify a content list related to a background screen. For example, the content list related to the background screen may include a plurality of pieces of content to be configured as a background screen of the electronic device 200. According to an embodiment, the processor 210 may identify pieces of content selected by a user input from among a plurality of pieces of content stored in the memory 230 of the electronic device 200. According to an embodiment, the processor 210 may identify pieces of content related to a theme selected by a user input from among the plurality of pieces of content stored in the memory 230 of the electronic device 200. According to an embodiment, the processor 210 may identify pieces of content selected by an application program being executed in the electronic device 200 from among the plurality of pieces of content stored in the memory 230 of the electronic device 200. According to an embodiment, the processor 210 may identify pieces of content selected based on a user input from among a plurality of pieces of content stored in an external electronic device (e.g., the electronic device 102 or 104 or the server 108 of FIG. 1) which is connected for communication through the wireless communication circuit 240. According to an embodiment, the processor 210 may identify information related to pieces of content to be configured as a background screen received from the external electronic device through the wireless communication circuit 240. For example, content may include at least one of still image content and video content.

According to various embodiments, in operation 303, the electronic device (e.g., the processor 120 or 210) may identify analysis information about each piece of content included in the content list related to the background screen. According to an embodiment, the processor 210 may detect analysis information about each piece of content to be configured as a background screen through image analysis of the content. For example, the analysis information about the content may include a region of interest (ROI) of the content and/or screen complexity (or screen complexity value) of the content. For example, the screen complexity (or screen complexity value) of the content is detected based on a feature included in a screen related to the content to be displayed on the display module 220, and the screen complexity (or screen complexity value) of the content may indicate at least one of uniformity of the screen, a change in color, and/or a movement of an object included in the screen. For example, the processor 210 may divide the screen of the content to be displayed on the display module 220 into a plurality of regions, and may estimate screen complexity in each region, based on a feature included in each region. According to an embodiment, the processor 210 may receive analysis information related to each piece of content to be configured as a background screen from the external electronic device through the wireless communication circuit 240.

According to various embodiments, in operation 305, the electronic device (e.g., the processor 120 or 210) may configure an output order of the plurality of pieces of content included in the content list, based on the analysis information (e.g., the region of interest (ROI) of the content and/or the screen complexity of the content) about the content. According to an embodiment, the processor 210 may configure an object display area for each piece of content, based on the analysis information (e.g., the region of interest and/or the screen complexity) about each of the plurality of pieces of content. For example, the object display area may include at least one region having a screen complexity less than or equal to a reference (screen) complexity within the screen of the content divided into the plurality of regions. For example, the reference complexity is a criterion for determining whether it is possible to display an object, and at least one region which is less than or equal to the reference complexity may be determined as being capable of displaying an object. When a given region is greater than the reference complexity, the given region is determined to not be capable of displaying the object. According to an embodiment, the processor 210 may configure the output order of the plurality of pieces of content, based on the object display area of each piece of content included in the content list and the shape and/or position of an object according to time. For example, as shown in FIG. 4A, FIG. 4B, and FIG. 4C, the shape and/or position of an object (e.g., a clock hand) 400, 410, or 420 respectively related to a clock (e.g., an analog clock) may change over time. The processor 210 may configure the output order of the plurality of pieces of content so that the object 400, 410, or 420 displayed on the display module 220 at a specific time is displayed in the object display area.

According to various embodiments, in operation 307, the electronic device (e.g., the processor 120 or 210) may sequentially output at least one piece of content as a background screen, based on the output order of the plurality of pieces of content. According to an embodiment, when an object display area of first content 402 corresponds to a position where the object is displayed at a first time (e.g., about 8:40), the processor 210 may control the display module 220 to output the first content 402 as a background screen at the first time (e.g., about 8:40) as shown in FIG. 4A. For example, the object 400 corresponding to the first time may be displayed in the object display area of the first content 402. For example, when the first content 402 is video content, the processor 210 may control the display module 220 to output the first content 402 until the object 400 leaves the object display area of the first content 402. For example, the first content 402 may be repeatedly played until the object 400 leaves the object display area of the first content 402. According to an embodiment, when an object display area of second content 412 corresponds to a position where the object is displayed at a second time (e.g., about 12:40), the processor 210 may control the display module 220 to output the second content 412 as a background screen at the second time (e.g., about 12:40) as shown in FIG. 4B. For example, the object 410 corresponding to the second time may be displayed in the object display area of the second content 412. For example, when the second content 412 is still image content, the processor 210 may control the display module 220 to output the second content 412 until the object 410 leaves the object display area of the second content 412. For example, the second content 412 may be continuously played until the object 410 leaves the object display area of the second content 412. According to an embodiment, when an object display area of third content 422 corresponds to a position where the object is displayed at a third time (e.g., about 2:10), the processor 210 may control the display module 220 to output the third content 422 as a background screen at the third time (e.g., about 2:10) as shown in FIG. 4C. For example, the object 420 corresponding to the third time may be displayed in the object display area of the third content 422. For example, when the third content 422 is video content, the processor 210 may control the display module 220 to output the third content 422 until the object 420 leaves the object display area of the third content 422. For example, the third content 422 may be repeatedly played until the object 420 leaves the object display area of the third content 422.

According to various embodiments, when there is a plurality of pieces of content having overlapping object display areas in the content list related to the background screen, the electronic device (e.g., the processor 120 or 210) may repeatedly output the plurality of pieces of content. According to an embodiment, the processor 210 may identify the first content 402 and fourth content having object display areas as which the position where the object is displayed at the first time (e.g., about 8:40) is configured at the first time among the pieces of content included in the content list related to the background screen. The processor 210 may control the display module 220 to repeatedly output the first content 402 and the fourth content until the object 400 leaves the object display area of the first content 402 and/or the object display area of the fourth content.

Figure 5:
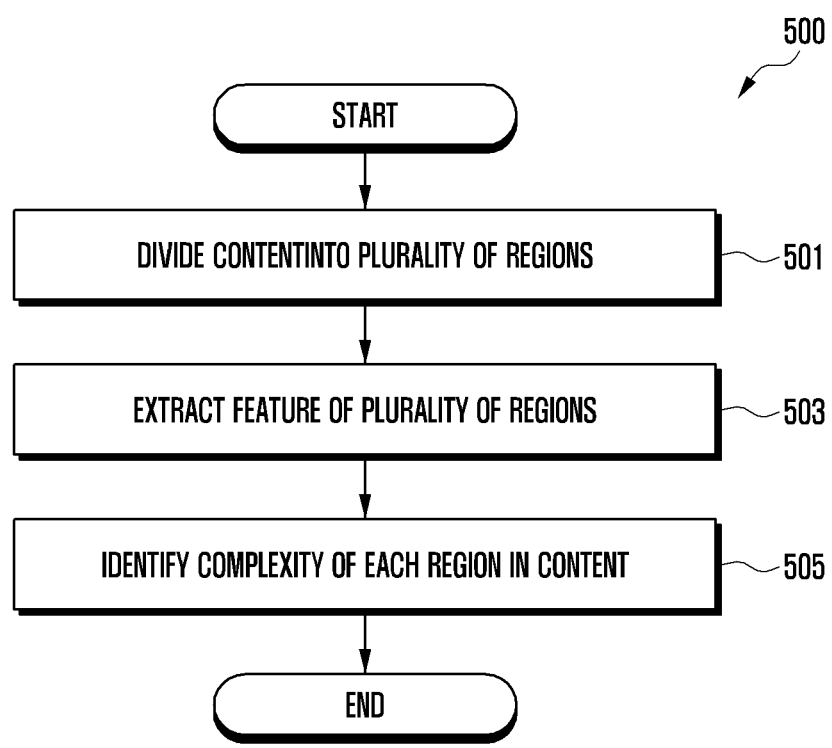
FIG. 5 is a flowchart for identifying screen complexity of content in an electronic device according to various embodiments of the disclosure.

FIG. 5 is a flowchart 500 for identifying complexity of a feature related to a screen of content in an electronic device according to various embodiments of the disclosure. According to an embodiment, operations of FIG. 5 may be detailed operations of operation 303 of FIG. 3. In the following embodiments, the operations may be sequentially performed, but are not necessarily performed sequentially. For example, the operations may be performed in a different order, or at least two operations may be performed in parallel. For example, the electronic device of FIG. may be the electronic device 101 of FIG. 1 or the electronic device 200 of FIG. 2. For example, at least some components of FIG. 5 will be described with reference to FIG. 6A, FIG. 6B, FIG. 6C, and FIG. 6D. FIG. 6A, FIG. 6B, FIG. 6C, and FIG. 6D illustrate examples of identifying complexity of a feature related to a screen of content in an electronic device according to various embodiments of the disclosure.

Figure 6A:
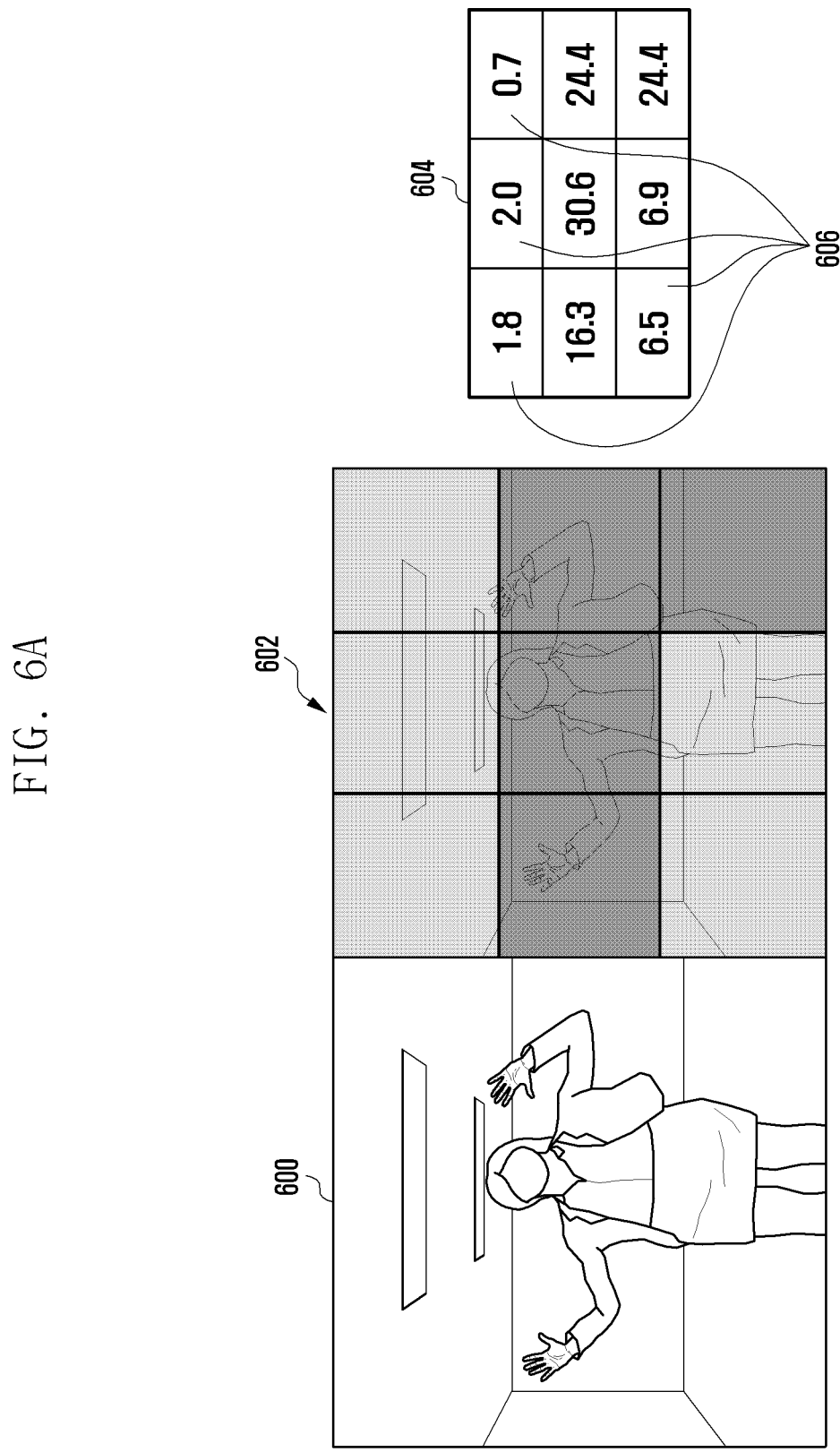
FIG. 6A illustrates an example of identifying complexity of a feature related to a screen of content in an electronic device according to various embodiments of the disclosure.
Figure 6B:
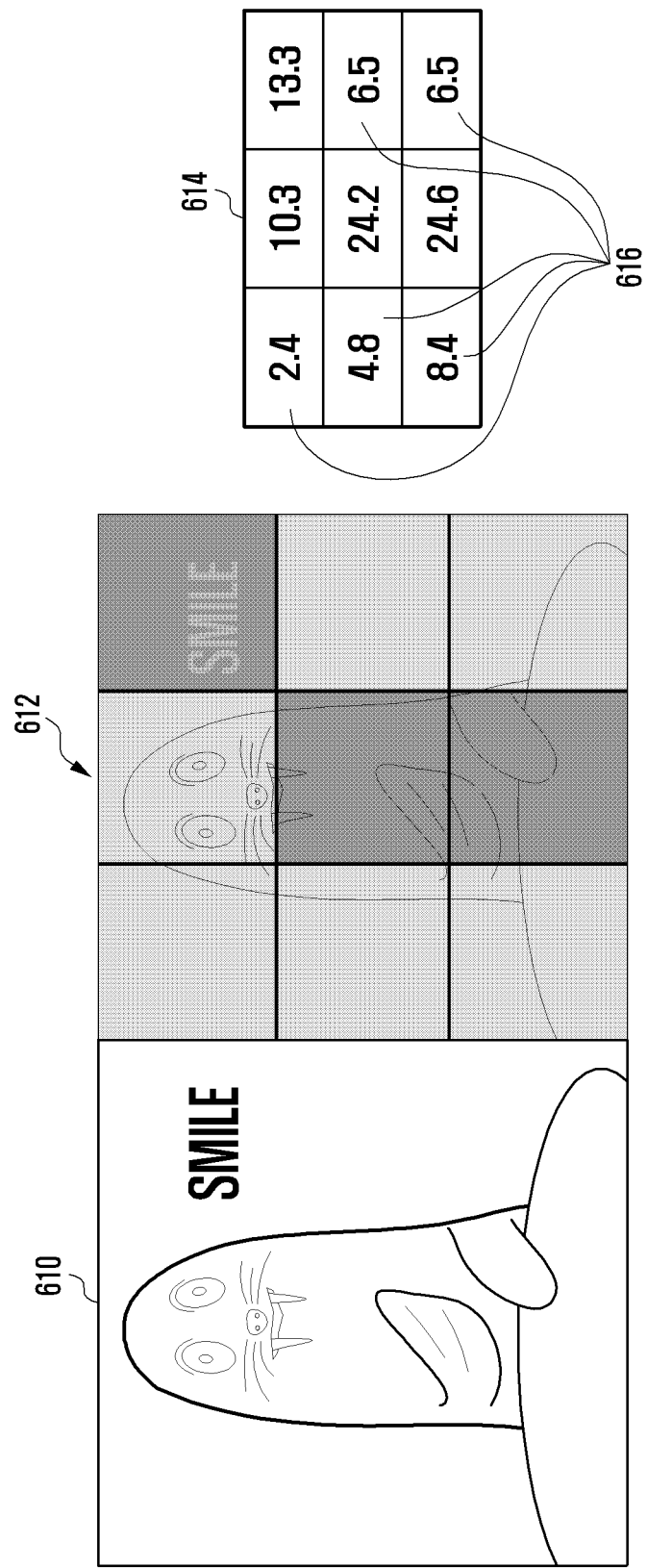
FIG. 6B illustrates an example of identifying complexity of a feature related to a screen of content in an electronic device according to various embodiments of the disclosure.
Figure 6C:
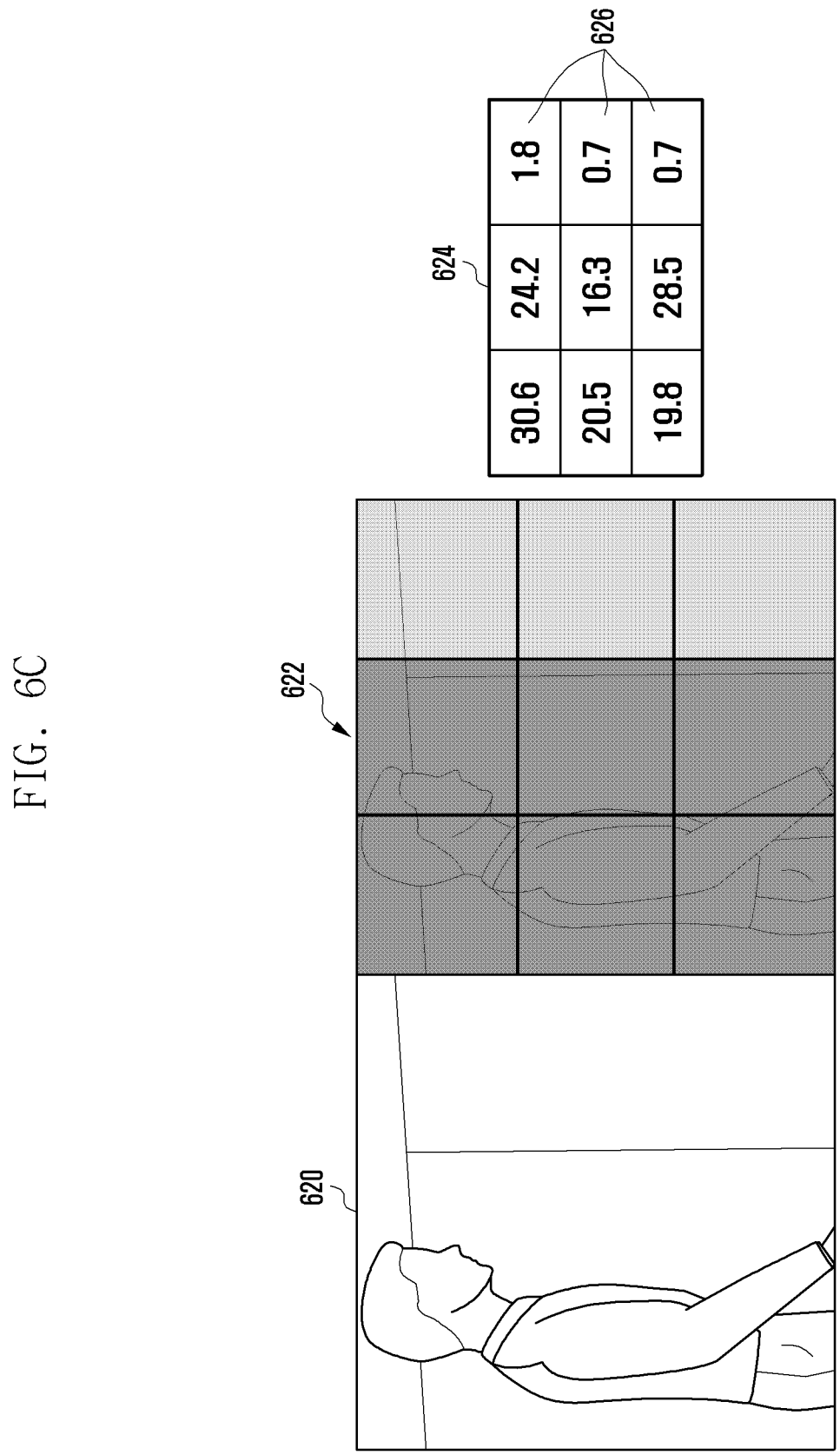
FIG. 6C illustrates an example of identifying complexity of a feature related to a screen of content in an electronic device according to various embodiments of the disclosure.
Figure 6D:
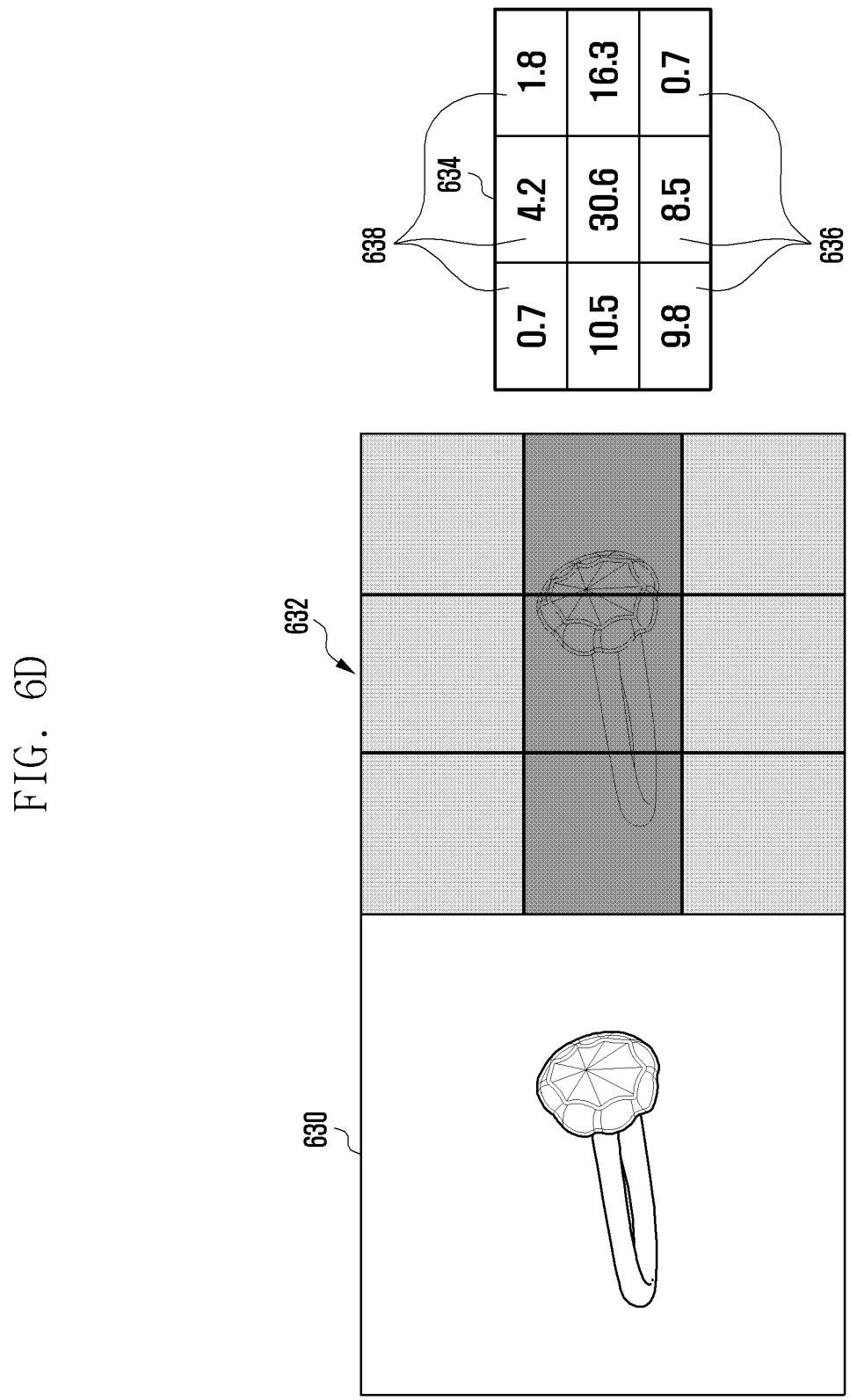
FIG. 6D illustrates an example of identifying complexity of a feature related to a screen of content in an electronic device according to various embodiments of the disclosure.

Referring to FIG. 5, according to various embodiments, in operation 501, the electronic device (e.g., the processor 120 of FIG. 1 or the processor 210 of FIG. 2) may divide content (e.g., still image content and/or video content) to be configured as a background screen into a plurality of regions. According to an embodiment, as shown in FIG. 6A, the processor 210 may divide first content 600 to be configured as a background screen into a first number of regions 602 (e.g., 3×3). According to an embodiment, as shown in FIG. 6B, the processor 210 may divide second content 610 to be configured as a background screen into a first number of regions 612 (e.g., 3×3). According to an embodiment, as shown in FIG. 6C, the processor 210 may divide third content 620 to be configured as a background screen into a first number of regions 622 (e.g., 3×3). According to an embodiment, as shown in FIG. 6D, the processor 210 may divide fourth content 630 to be configured as a background screen into a first number of regions 632 (e.g., 3×3).

According to various embodiments, in operation 503, the electronic device (e.g., the processor 120 or 210) may extract a feature included in each divided region of the content. For example, the feature included in each region may include a feature extracted based on at least one of a statistical value of intensity of a screen of the content to be displayed as a background screen, color distribution, a gradient histogram, gradient statistics, a transform coefficient of a frequency domain, and/or a distribution parameter. Image processing can be performed on each region to obtain the statistical value of intensity, the color distribution, the gradient histogram, the gradient statistics, the transform coefficient of a frequency domain, and/or the distribution parameter, as understood by one of ordinary skill in the art.

According to various embodiments, in operation 505, the electronic device (e.g., the processor 120 or 210) may identify screen complexity of each region, based on the feature of each divided region of the content. According to an embodiment, when the content to be configured as the background screen is video content, the processor 210 may divide each frame included in the video content into a plurality of regions. The processor 210 may estimate screen complexity in each region for each frame. For example, screen complexity of the video content may include the average of screen complexities of frames in each region. For example, in the first content 600, screen complexity 604 by each region may be detected as shown in FIG. 6A. For example, an object display area of the first content 600 may include at least one area 606 having a screen complexity less than or equal to a reference complexity (e.g., 10). For example, in the second content 610, screen complexity 614 by each region may be detected as shown in FIG. 6B. For example, an object display area of the second content 610 may include at least one area 616 having a screen complexity less than or equal to the reference complexity (e.g., 10). For example, in the third content 620, screen complexity 624 by each region may be detected as shown in FIG. 6C. For example, an object display area of the third content 620 may include at least one area 626 having a screen complexity less than or equal to the reference complexity (e.g., 10). For example, in the fourth content 630, screen complexity 634 by each region may be detected as shown in FIG. 6D. For example, an object display area of the fourth content 630 may include at least one area 636 and 638 having a screen complexity less than or equal to the reference complexity (e.g., 10).

Figure 7:
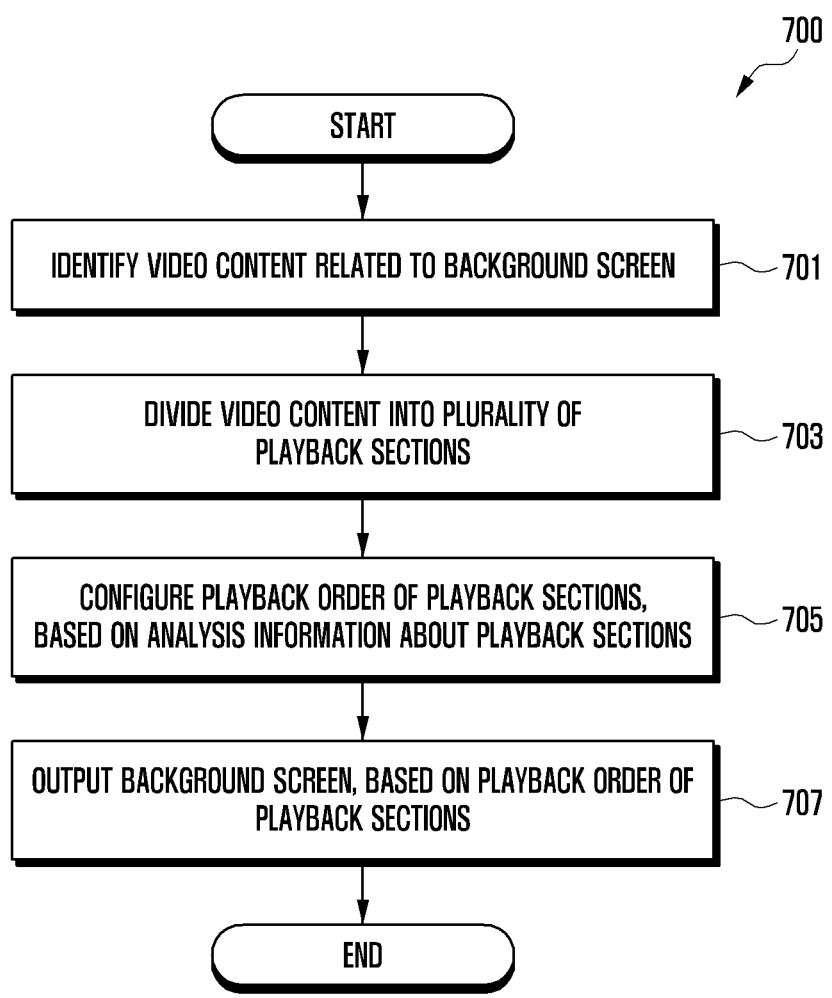
FIG. 7 is a flowchart for configuring a playback order of video content in an electronic device according to various embodiments of the disclosure.

FIG. 7 is a flowchart 700 for configuring a playback order of video content in an electronic device according to various embodiments of the disclosure. In the following embodiments, operations may be sequentially performed, but are not necessarily performed sequentially. For example, the operations may be performed in a different order, or at least two operations may be performed in parallel. For example, the electronic device of FIG. 7 may be the electronic device 101 of FIG. 1 or the electronic device 200 of FIG. 2.

Referring to FIG. 7, according to various embodiments, in operation 701, the electronic device (e.g., the processor 120 of FIG. 1 or the processor 210 of FIG. 2) may identify video content to be configured as a background screen. According to an embodiment, the video content to be configured as the background screen may include video content selected by a user input or an application program from among a plurality of pieces of content stored in the memory 230 of the electronic device 200. According to an embodiment, the video content to be configured as the background screen may include video content selected by a user input or an application program from among a plurality of pieces of content stored an external electronic device (e.g., the electronic device 102 or 104 or the server 108 of FIG. 1). According to an embodiment, the video content to be configured as the background screen may be identified based on information related to pieces of content to be configured as a background screen received from the external electronic device.

According to various embodiments, in operation 703, the electronic device (e.g., the processor 120 or 210) may divide the video content to be configured as the background screen into a plurality of playback sections. According to an embodiment, the processor 210 may divide the video content into the plurality of playback sections, based on a region of interest and/or screen complexity of each of a plurality of frames included in the video content. For example, a playback section may include at least two consecutive frames determined to have a relative similarity in the position of a region of interest and/or screen complexity. For example, the at least two consecutive frames determined to have the relative similarity in the position of the region of interest and/or the screen complexity may include (i) frames that are consecutive in the playback order and have a difference in a region of interest therebetween within a reference distance or (ii) frames that are consecutive in the playback order and have a difference in screen complexity therebetween within a reference value.

According to various embodiments, in operation 705, the electronic device (e.g., the processor 120 or 210) may configure a playback order of the playback sections, based on analysis information (e.g., a region of interest (ROI) of the content and/or screen complexity of the content) about the playback sections of the video content. According to an embodiment, the processor 210 may configure an object display area for each playback section, based on analysis information (e.g., a region of interest and/or screen complexity) about each playback section. For example, the object display area may include at least one area having screen complexity less than or equal to a reference complexity within a frame divided into a plurality of regions.

According to an embodiment, the processor 210 may configure (or update) the playback order of the playback sections, based on the object display area of each playback section and the shape and/or position of an object according to time.

According to various embodiments, in operation 707, the electronic device (e.g., the processor 120 or 210) may output a background screen, based on the playback order of the playback sections included in the video content. According to an embodiment, a playback order of the video content output through the background screen may be the same as or different from an original playback order of the video content. For example, the original playback order of the video content may include a playback order of the video content executed via a video application program.

According to various embodiments, when there is a plurality of pieces of video content to be configured as a background screen, the electronic device (e.g., the processor 120 or 210) may detect a plurality of playback sections of at least one piece of video content. The electronic device (e.g., the processor 120 or 210) may configure a playback order of the playback sections, based on analysis information about the plurality of playback sections (e.g., a region of interest (ROI) of the content and/or screen complexity of the content).

According to an embodiment, the processor 210 may detect two playback periods from first video content to be configured as a background screen, and may detect three playback sections from second video content. The processor 210 may configure a playback order of the playback sections, based on analysis information about the five playback sections detected from the first video content and the second video content. For example, the processor 210 may configure the playback order of the playback sections, based on the analysis information about the playback sections regardless of the pieces of video content from which the playback sections are detected.

According to an embodiment, the processor 210 may detect three playback sections from first video content to be configured as a background screen, and may recognize second video content as one playback section. The processor 210 may configure a playback order of the playback sections, based on analysis information about the three playback sections detected from the first video content and the one playback section (e.g., the second video content) detected from the second video content.

Figure 8:
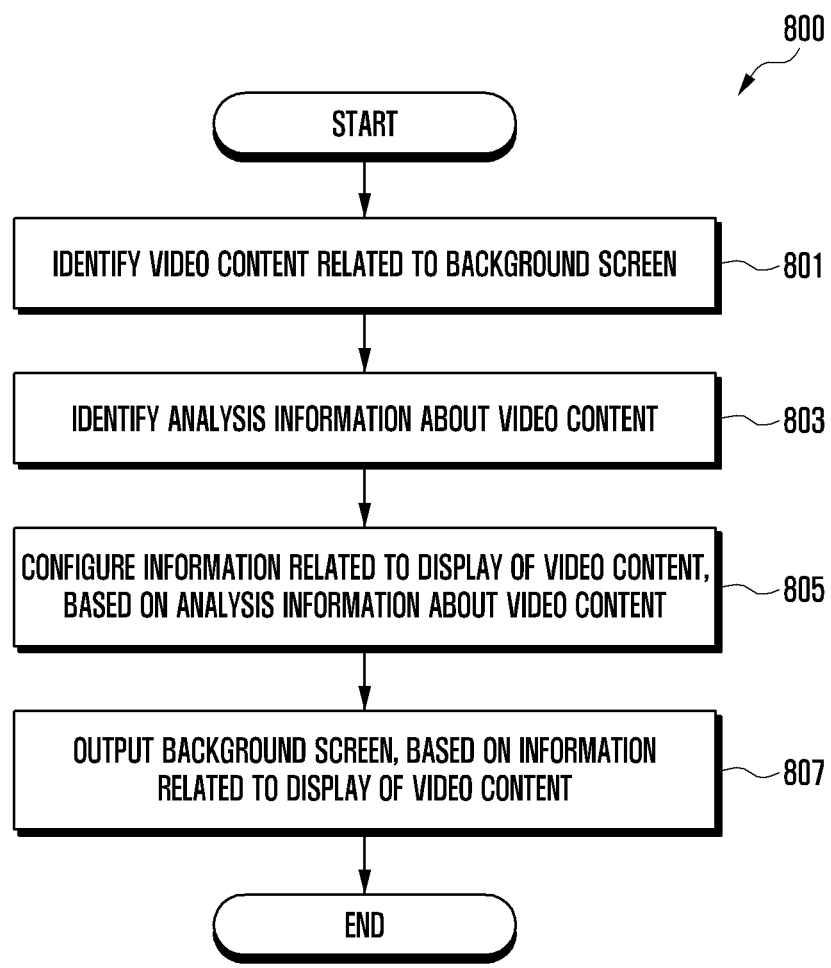
FIG. 8 is a flowchart for configuring information related to display of content to be configured as a background screen in an electronic device according to various embodiments of the disclosure.
Figure 9A:
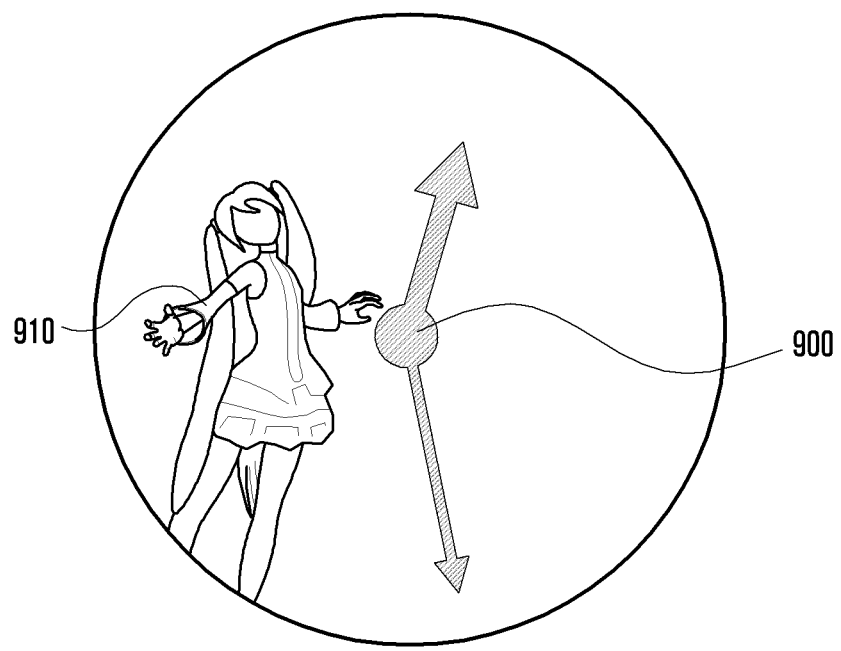
FIG. 9A illustrates an example of displaying video content as a background screen in an electronic device according to various embodiments of the disclosure.
Figure 9B:
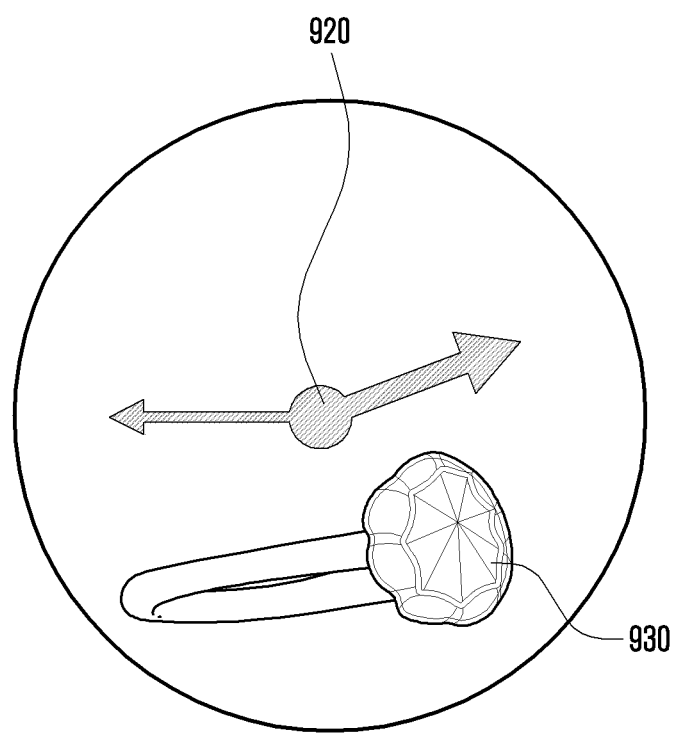
FIG. 9B illustrates an example of displaying video content as a background screen in an electronic device according to various embodiments of the disclosure.

FIG. 8 is a flowchart 800 for configuring a component related to display of content to be configured as a background screen in an electronic device according to various embodiments of the disclosure. In the following embodiments, operations may be sequentially performed, but are not necessarily performed sequentially. For example, the operations may be performed in a different order, or at least two operations may be performed in parallel. For example, the electronic device of FIG. 8 may be the electronic device 101 of FIG. 1 or the electronic device 200 of FIG. 2. For example, at least some components of FIG. 8 will be described with reference to FIG. 9A and FIG. 9B. FIG. 9A and FIG. 9B illustrate examples of displaying video content as a background screen in an electronic device according to various embodiments of the disclosure.

Referring to FIG. 8, according to various embodiments, in operation 801, the electronic device (e.g., the processor 120 of FIG. 1 or the processor 210 of FIG. 2) may identify content (e.g., still image content and/or video content) related to a background screen. According to an embodiment, the content related to the background screen may include video content selected by a user input or an application program from among a plurality of pieces of content stored in the memory 230 of the electronic device 200 or an external electronic device (e.g., the electronic device 102 or 104 or the server 108 of FIG. 1). According to an embodiment, the content related to the background screen may be identified based on information related to pieces of content to be configured as a background screen received from the external electronic device.

According to various embodiments, in operation 803, the electronic device (e.g., the processor 120 or 210) may identify analysis information about the content related to the background screen. According to an embodiment, when the content related to the background screen is video content, the processor 210 may identify a region of interest and/or screen complexity of the video content through image analysis of each frame included in the video content. For example, the region of interest of the video content may be configured based on the average of regions of interest included in respective frames included in the video content. For example, the screen complexity of the video content may be configured for each region, based on the average of screen complexities of regions included in respective frames included in the video content. According to an embodiment, the processor 210 may divide the video content into a plurality of playback sections, based on a region of interest and/or screen complexity of each of a plurality of frames included in the video content. For example, a playback section may include at least two consecutive frames determined to have a relative similarity in the position of a region of interest and/or screen complexity. For example, the at least two consecutive frames determined to have the relative similarity in the position of the region of interest and/or the screen complexity may include (i) frames that are consecutive in the playback order and have a difference in a region of interest therebetween within a reference distance or (ii) frames that are consecutive in the playback order and have a difference in screen complexity therebetween within a reference value. For example, the processor 210 may configure a region of interest and/or screen complexity for each playback section. According to an embodiment, the processor 210 may receive analysis information about video content to be configured as a background screen from the external electronic device through the wireless communication circuit 240.

According to various embodiments, in operation 805, the electronic device (e.g., the processor 120 or 210) may configure information related to display of the content, based on the analysis information (e.g., a region of interest (ROI) of the content and/or screen complexity of the content) about the content related to the background screen. According to an embodiment, the processor 210 may adjust at least one of the position and/or size of the content so that the region of interest of the content to be display as the background screen does not overlap a region where at least one object is displayed. For example, the region where the object is displayed may be configured based on the position and/or size of the object. According to an embodiment, the processor 210 may configure an object display area, based on the screen complexity of the content to be displayed as the background screen. The processor 210 may adjust at least one of the position and/or size of the content so that the at least one object is displayed in the object display area of the content. For example, the information related to the display of the content may include at least one of the size of the region of interest of the content or the position of the region of interest.

According to various embodiments, in operation 807, the electronic device (e.g., the processor 120 or 210) may output the content as the background screen, based on the information related to the display of the content. According to an embodiment, as shown in FIG. 9A, the processor 210 may control the display module 220 to change a display position of first content 910 so that a region of interest of the first content 910 does not overlap a first object 900, based on the information related to the display of the content. According to an embodiment, as shown in FIG. 9B, the processor 210 may control the display module 220 to change a display position and/or size of second content 930 so that a region of interest of the second content 930 does not overlap a second object 920, based on the information related to the display of the content.

Figure 10:
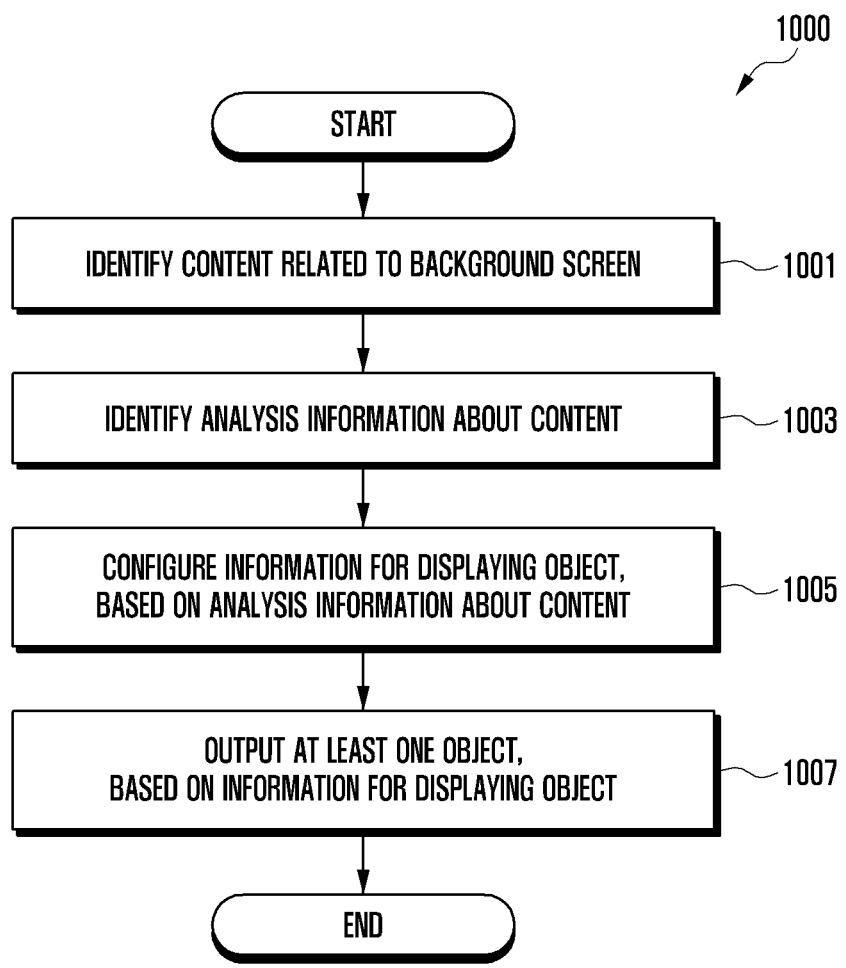
FIG. 10 is a flowchart for configuring information related to display of an object in an electronic device according to various embodiments of the disclosure.
Figure 11A:
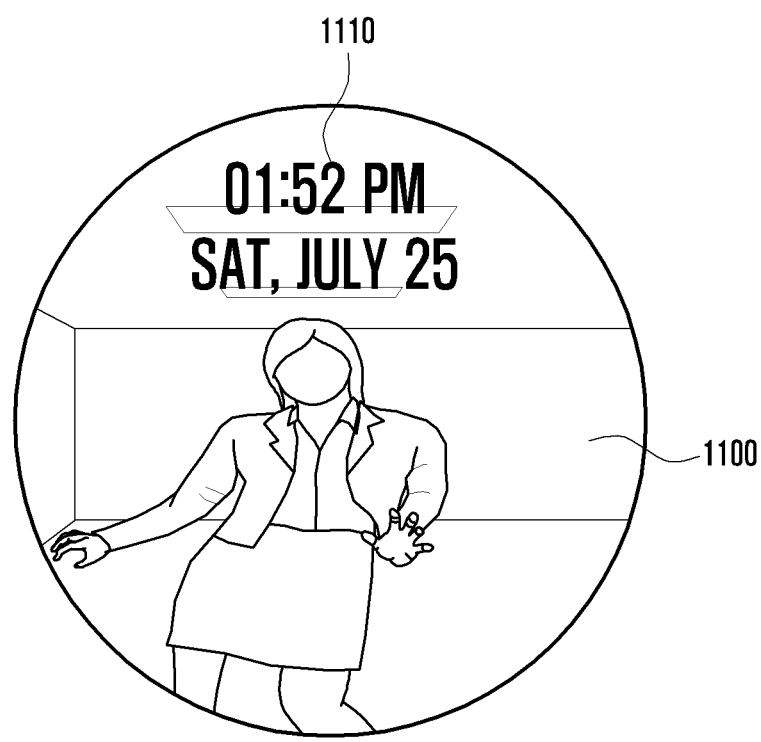
FIG. 11A illustrates an example of displaying an object in an upper area of a background screen in an electronic device according to various embodiments of the disclosure.
Figure 11B:
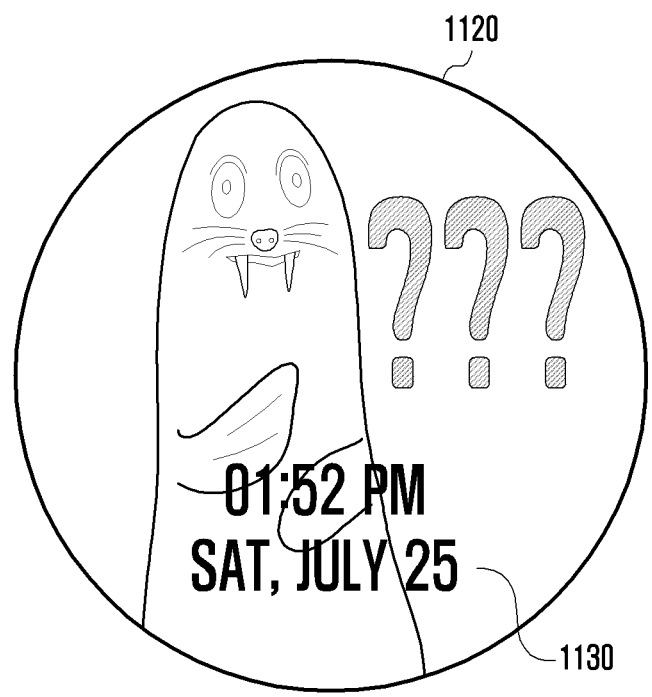
FIG. 11B illustrates an example of displaying an object in an upper area of a background screen in an electronic device according to various embodiments of the disclosure.

FIG. 10 is a flowchart 1000 for configuring a component related to display of an object in an electronic device according to various embodiments of the disclosure. In the following embodiments, operations may be sequentially performed, but are not necessarily performed sequentially. For example, the operations may be performed in a different order, or at least two operations may be performed in parallel. For example, the electronic device of FIG. 10 may be the electronic device 101 of FIG. 1 or the electronic device 200 of FIG. 2. For example, at least some components of FIG. 10 will be described with reference to FIG. 11A and FIG. 11B. FIG. 11A and FIG. 11B illustrate examples of displaying an object in an upper area of a background screen in an electronic device according to various embodiments of the disclosure.

Referring to FIG. 10, according to various embodiments, in operation 1001, the electronic device (e.g., the processor 120 of FIG. 1 or the processor 210 of FIG. 2) may identify content (e.g., still image content and/or video content) related to a background screen. According to an embodiment, the content related to the background screen may include content selected by a user input or an application program from among a plurality of pieces of content stored in the memory 230 of the electronic device 200 or an external electronic device (e.g., the electronic device 102 or 104 or the server 108 of FIG. 1). According to an embodiment, the content related to the background screen may be identified based on information related to content to be configured as a background screen received from the external electronic device. For example, the content related to the background screen may include at least one of an image (or still image) or video content.

According to various embodiments, in operation 1003, the electronic device (e.g., the processor 120 or 210) may identify analysis information about the content related to the background screen. According to an embodiment, when the content related to the background screen is video content, the processor 210 may identify a region of interest and/or screen complexity of the content through image analysis of each frame included in the video content. According to an embodiment, the processor 210 may receive analysis information about content to be configured as a background screen from the external electronic device through the wireless communication circuit 240.

According to various embodiments, in operation 1005, the electronic device (e.g., the processor 120 or 210) may configure information related to display of at least one object, based on the analysis information (e.g., a region of interest (ROI) of the content and/or screen complexity of the content) about the content related to the background screen. According to an embodiment, the processor 210 may adjust at least one of the position or size of the at least one object so that the region of interest of the content to be displayed as the background screen does not overlap a region where the at least one object is displayed. For example, the region where the object is displayed may be configured based on the position and/or size of the object. According to an embodiment, the processor 210 may configure an object display area, based on the screen complexity of the content to be displayed as the background screen. The processor 210 may adjust at least one of the position and/or size of the at least one object so that the at least one object is displayed in the object display area of the content to be displayed as the background screen.

According to various embodiments, in operation 1007, the electronic device (e.g., the processor 120 or 210) may output the at least one object, based on the information related to the display of the at least one object. According to an embodiment, as shown in FIG. 11A, the processor 210 may control the display module 220 to change a display position of first object 1100 not to overlap a region of interest of the first content 1110, based on the information related to the display of the object. For example, the first object 1100 may be displayed in a second display layer overlapping at least part of the first display layer in an upper area of the first display layer where the first content 1110 is displayed. According to an embodiment, as shown in FIG. 11B, the processor 210 may control the display module 220 to change a display position and/or size of second object 1120 so that a region of interest of second content 1130 does not overlap the second object 1120, based on the information related to the display of the object.

According to various embodiments, an operating method of an electronic device (e.g., the electronic device 101 of FIG. 1 or the electronic device 200 of FIG. 2) may include identifying a plurality of pieces of content to be displayed on a display module (e.g., the display module 160 of FIG. 1 or the display module 220 of FIG. 2) operatively connected to the electronic device, identifying screen complexity of each piece of content, based on a feature included in a screen of the plurality of pieces of content, obtaining display information about an object to be displayed above the plurality of pieces of content on the display module, configuring an output order of the plurality of pieces of content, based on the screen complexity of the content and the display information about the object, and displaying the object, based on the display information about the object, and the plurality of pieces of content under the object displayed on the display module, based on the output order.

According to various embodiments, the identifying of the screen complexity may include dividing the screen of the content into a plurality of regions, and analyzing the screen complexity of the content by region, based on a feature included in each region.

According to various embodiments, the configuring of the output order of the plurality of pieces of content may include configuring at least one region of each piece of content as an object display area, based on the screen complexity of the content by region, and configuring the output order of the plurality of pieces of content so that the object is displayed in the object display area of the content, based on the display information about the object.

According to various embodiments, the object display area may include at least one region having screen complexity less than or equal to a reference complexity among the plurality of regions included in the content.

According to various embodiments, the display information about the object may include at least one piece of information among a display position, a size, a color, a shape, and/or a brightness of the object changing over time.

According to various embodiments, the display information about the object may include position information about a clock hand changing clockwise over time when the object is related to an analog clock.

According to various embodiments, the identifying of the screen complexity may include identifying information related to the screen complexity of the plurality of pieces of content received from an external electronic device.

Embodiments of the disclosure disclosed in the specification and drawings are only intended to provide specific examples for easily describing the technical content according to the embodiments of the disclosure and for assisting understanding of the embodiments of the disclosure, and are not intended to limit the scope of the embodiments of the disclosure. Therefore, it should be interpreted that the scope of various embodiments of the disclosure includes all changes or modifications derived based on the technical idea of various embodiments of the disclosure in addition to the embodiments disclosed herein.

What is claimed is:

1. An electronic device comprising:
   a display;
   at least one processor configured to be operatively connected to the display; and;
   memory storing instructions which, when executed by the at least one processor, cause the electronic device to:
   select a plurality of pieces of content to be displayed on the display based on user input;
   in response to the selection of the plurality of pieces of content, identify a screen complexity value of each of the plurality of pieces of content, based on a feature included in a screen of the plurality of pieces of content;
   obtain display information of an object to be displayed above the plurality of pieces of content on the display, wherein the display information of the object comprises information related to change in at least one attribute of the object over time;
   configure an output order of the plurality of pieces of content, based on the screen complexity value of the plurality of pieces of content and the display information of the object;
   display, via the display, the object based on the display information of the object; and
   display, via the display, each of the plurality of pieces of content sequentially under the object based on the output order and at least one changed attribute of the object over time.

2. The electronic device of claim 1, wherein the instructions which, when executed by the at least one processor, cause the electronic device to:
   divide the screen of each of the plurality of pieces of content into a plurality of regions; and
   identify the screen complexity value of each of the plurality of pieces of content by a region, based on the feature included in each of the plurality of regions.

3. The electronic device of claim 2, wherein the instructions which, when executed by the at least one processor, cause the electronic device to:
   configure at least one region of each of the plurality of pieces of content as an object display area, based on the screen complexity value of the plurality of pieces of content by the region; and
   configure the output order of the plurality of pieces of content so that the object is displayed in the object display area of the plurality of pieces of content, based on the display information of the object.

4. The electronic device of claim 3, wherein the object display area comprises at least one region having the screen complexity value less than or equal to a reference complexity among the plurality of regions included in the plurality of pieces of content.

5. The electronic device of claim 1, wherein the at least one attribute of the object comprises at least one of a display position, a size, a color, a shape, or a brightness of the object.

6. The electronic device of claim 5, wherein the display information of the object comprises position information of a clock hand changing clockwise over time when the object is related to an analog clock.

7. The electronic device of claim 1, wherein the memory stores the screen complexity value of the plurality of pieces of content,
   wherein the instructions which, when executed by the at least one processor, cause the electronic device to identify the screen complexity value of each of the plurality of pieces of content stored in the memory.

8. The electronic device of claim 7, further comprising a wireless communication circuit,
   wherein the memory is configured to store the screen complexity value of the plurality of pieces of content received from an external electronic device through the wireless communication circuit.

9. An operating method of an electronic device, the method comprising:
   selecting a plurality of pieces of content to be displayed on a display operatively connected to the electronic device based on user input;
   in response to the selection of the plurality of pieces of content, identifying a screen complexity value of each of the plurality of pieces of content, based on a feature included in a screen of the plurality of pieces of content;
   obtaining display information of an object to be displayed above the plurality of pieces of content on the display, wherein the display information of an object comprises information related to change in at least one attribute of the object over time;
   configuring an output order of the plurality of pieces of content, based on the screen complexity value of the plurality of pieces of content and the display information of the object;
   displaying the object based on the display information of the object; and
   displaying each of the plurality of pieces of content sequentially under the object displayed on the display based on the output order and at least one changed attribute of the object over time.

10. The method of claim 9, wherein the identifying of the screen complexity value comprises dividing the screen of each of the plurality of pieces of content into a plurality of regions, and analyzing the screen complexity value of each of the plurality of pieces of content by a region, based on the feature included in each of the plurality of regions.

11. The method of claim 10, wherein the configuring of the output order of the plurality of pieces of content comprises:
configuring at least one region of each of the plurality of pieces of content as an object display area, based on the screen complexity value of the plurality of pieces of content by the region; and
configuring the output order of the plurality of pieces of content so that the object is displayed in the object display area of the plurality of pieces of content, based on the display information of the object.

12. The method of claim 11, wherein the object display area comprises at least one region having the screen complexity value less than or equal to a reference complexity among the plurality of regions included in the plurality of pieces of content.

13. The method of claim 9, wherein the at least one attribute of the object comprises at least one of a display position, a size, a color, a shape, or a brightness of the object.

14. The method of claim 13, wherein the display information of the object comprises position information of a clock hand changing clockwise over time when the object is related to an analog clock.

15. The method of claim 9, wherein the identifying of the screen complexity value comprises identifying information related to the screen complexity value of the plurality of pieces of content received from an external electronic device.

16. An electronic device comprising:
a display;
at least one processor configured to be operatively connected to the display; and
memory storing instructions which, when executed by the at least one processor, cause the electronic device to:
identify a content to be displayed on the display;
identify at least one of a screen complexity value of each of a plurality of frames included in the content or a region of interest of each of the plurality of frame, based on a feature included in a screen of the plurality of frames;
divide the content into a plurality of playback sections based on at least one of the screen complexity value of each of the plurality of frames or the region of interest of each of the orality of frames;
identify at least one of the screen complexity value of each of the plurality playback sections or the region of interest of each of the plurality of playback sections, based on at least one of the screen complexity value of each of the plurality of frames or the region of interest of each of the plurality of frames;
obtain display information of an object to be displayed above the content on the display, wherein the display information of the object comprises information related to change in at least one attribute of the object over time;
configure a play order of the plurality of playback sections, based on at least one of the screen complexity value of the plurality of playback sections or the region of interest of the plurality of playback sections and the display information of the object;
display, via the display, the object based on the display information of the object; and
display, via the display, each of the plurality of play sections sequentially under the object based on the play order and at least one changed attribute of the object over time.

17. The electronic device of claim 16, wherein the playback section includes at least two consecutive frames determined to have a relative similarity in the position of the region of interest and/or the screen complexity.

18. The electronic device of claim 16, wherein the at least one attribute of the object comprises at least one of a display position, a size, a color, a shape, or a brightness of the object.

* * * * *